United States Patent
Reiter et al.

(10) Patent No.: US 9,644,653 B2
(45) Date of Patent: May 9, 2017

(54) LIGHTWEIGHT CONSTRUCTION PANEL, CONNECTING ARRANGEMENT AND METHOD FOR PRODUCING A CONNECTING ARRANGEMENT

(71) Applicant: FRITZ EGGER GMBH & CO. OG, Unterradlberg (AT)

(72) Inventors: Bruno Reiter, St. Johann in Tirol (AT); Helmut Nerf, Tuessling (DE)

(73) Assignee: Fritz Egger GmbH & Co. OG, Unterradlberg (AT)

( * ) Notice: Subject to any disclaimer, the term of this patent is extended or adjusted under 35 U.S.C. 154(b) by 161 days.

(21) Appl. No.: 14/389,979

(22) PCT Filed: Dec. 28, 2012

(86) PCT No.: PCT/EP2012/077030
§ 371 (c)(1),
(2) Date: Oct. 1, 2014

(87) PCT Pub. No.: WO2013/149689
PCT Pub. Date: Oct. 10, 2013

(65) Prior Publication Data
US 2015/0072099 A1  Mar. 12, 2015

(30) Foreign Application Priority Data

Apr. 4, 2012 (DE) .......... 10 2012 006 755
May 2, 2012 (DE) .......... 10 2012 008 520

(51) Int. Cl.
*F16B 5/00* (2006.01)
*F16B 5/01* (2006.01)
(Continued)

(52) U.S. Cl.
CPC .......... *F16B 5/002* (2013.01); *B32B 3/06* (2013.01); *F16B 5/0016* (2013.01); *F16B 5/01* (2013.01);
(Continued)

(58) Field of Classification Search
CPC ........................................ F16B 5/002
(Continued)

(56) References Cited

U.S. PATENT DOCUMENTS 1,954,242 A  8/1943  Heppenstall
4,663,912 A  5/1987  Vinther
(Continued)

FOREIGN PATENT DOCUMENTS

DE  1876723 U  8/1963
DE  3402923 A1  8/1985
(Continued)

*Primary Examiner* — Brent O'Hern
(74) *Attorney, Agent, or Firm* — Rankin, Hill & Clark LLP

(57) ABSTRACT

A lightweight board having an upper covering layer, which extends in a longitudinal direction, a lower covering layer, which extends parallel to the upper covering layer and is spaced apart from the upper covering layer in a direction perpendicular to the longitudinal direction, a light middle layer, which extends between the upper covering layer and the lower covering layer, and a bar, which extends between the upper covering layer and the lower covering layer and consists of wood or wood-based material. To simplify the production of a connection arrangement, the bar has a machine-worked tongue profile and/or groove profile, which is formed for mechanical locking in the longitudinal direction and in the direction perpendicular to the longitudinal direction with a corresponding profile of a further component. The invention also relates to a corresponding connection arrangement and a corresponding method for producing a connection arrangement.

12 Claims, 6 Drawing Sheets

(51) Int. Cl.
*F16B 5/06* (2006.01)
*B32B 3/06* (2006.01)
*F16B 12/26* (2006.01)

(52) U.S. Cl.
CPC ............ *F16B 5/0614* (2013.01); *F16B 12/26* (2013.01); *Y10T 29/49826* (2015.01); *Y10T 29/49888* (2015.01); *Y10T 428/192* (2015.01); *Y10T 428/24008* (2015.01)

(58) Field of Classification Search
USPC .......................................................... 428/58
See application file for complete search history.

(56) References Cited

U.S. PATENT DOCUMENTS

| | | |
|---|---|---|
| 6,314,701 B1 | 11/2001 | Meyerson |
| 2004/0060255 A1 | 4/2004 | Knauseder |
| 2006/0080927 A1* | 4/2006 | Schulte ............. E04F 15/02161 52/592.1 |
| 2010/0009115 A1* | 1/2010 | Ruhdorfer ................. B32B 3/02 428/99 |
| 2012/0040135 A1 | 2/2012 | Werthen et al. |

FOREIGN PATENT DOCUMENTS

| | | |
|---|---|---|
| DE | 29513784 U1 | 10/1995 |
| DE | 202004012141 U1 | 10/2004 |
| DE | 102006027982 B3 | 12/2007 |
| DE | 102007007832 A1 | 11/2008 |
| EP | 1400641 A2 | 3/2004 |
| EP | 1516977 A1 | 3/2005 |
| JP | S6376142 U | 5/1988 |
| JP | S63255467 A | 10/1988 |
| JP | 08-100510 A | 4/1996 |
| JP | 10-193491 A | 7/1998 |
| WO | 2007/144403 A1 | 12/2007 |
| WO | 2008/021044 A2 | 2/2008 |
| WO | 2011151758 A2 | 12/2011 |

* cited by examiner

LIGHTWEIGHT CONSTRUCTION PANEL, CONNECTING ARRANGEMENT AND METHOD FOR PRODUCING A CONNECTING ARRANGEMENT

BACKGROUND OF THE INVENTION

Field of the Invention

The present invention relates to a lightweight board having an upper covering layer, which extends in a longitudinal direction, having a lower covering layer, which extends parallel to the upper covering layer and is spaced apart from the upper covering layer in a direction perpendicular to the longitudinal direction, having a light middle layer, which extends between the upper covering layer and the lower covering layer, and having a bar, which extends between the upper covering layer and the lower covering layer and consists of wood or wood-based material. The invention also relates to a connection arrangement comprising such a lightweight board and comprising a further component. The invention finally relates to a method for producing such a connection arrangement.

Description of Related Art

Lightweight boards have been known from the prior art for a long time. They have an upper and a lower covering layer and a light middle layer, that is, a middle layer consisting of a material of a lower density than the covering layers, arranged therebetween. Lightweight boards have been used for a long time in many different ways, especially in furniture and interior construction.

Lightweight boards are used inter alia in the field of high-class fittings, especially in furniture construction, because their use allows very large wall thicknesses to be realised, which offer particular design possibilities. Recently, lightweight boards have also been used in mass-produced furniture, so even use on a broader scale is economically possible. The different advantages of the lightweight boards are thus accessible to a larger class of end users.

Lightweight boards are also increasingly being produced industrially. To this end, a light middle layer is provided with the covering layers, usually by adhesive bonding, so that a large-format composite is produced. Depending on the required stability of the board, covering layers of different thicknesses are used, usually consisting of a wood-based material such as a chipboard, fibreboard or OSB board. The boards used can be already coated, that is, provided for instance with a laminate, a paint, a print with a seal, a melamine resin layer, a veneer etc. Honeycomb cardboard or foam boards consisting of expanded plastic are preferred as the middle layers. Honeycomb materials consisting of materials other than cardboard may also be sensible for certain purposes. Extremely thin board materials or else thin metal, for example consisting of aluminum, can be used for this. It is however also possible to use lightweight wood-based materials such as appropriate chipboards or fibreboards or else solid wood of low density such as balsa wood as the middle layers. In principle all materials are possible for use as the light middle layer if provided with corresponding recesses/cavities. For instance, wood types are also used that do not have a particularly low weight but are easily available and can be worked well with cutting tools.

For stability reasons, so called bars can be inserted between the covering layers at one or more end faces of a lightweight board, said bars usually consisting of a wood-based material and being able to absorb relatively large compressive forces perpendicular to the board plane. A plurality of bars can also be connected to each other to form a frame. Such a bar generally has a rectangular cross section in a section perpendicular to the board plane and generally runs over the entire width (transverse bar) or over the entire length (longitudinal bar) of the lightweight board. Such bars or frames prevent the light middle layer, which often consists of cardboard webs, from being damage in the event of high compressive loading perpendicular to the board plane.

Lightweight boards of the above-described type and having the described features also form the basis of the present invention. This applies in particular to the described materials of the covering layers and of the middle layer.

Furniture is very often produced from wood-based materials such as the chipboards or fibreboards already mentioned. The individual elements or boards are usually connected by means of screw fastenings, dowels, various carcass connectors, adhesive bonding or combinations thereof.

The connections usually used in the prior art are realised by means of the described fitting parts (screw fastenings, dowels etc.). These have a number of disadvantages: they entail considerable costs, tools are needed for assembly, the end user generally required a certain amount of practice if assembling a piece of furniture himself, he does not have optimal tools or suitable retaining devices, he must use muscular force and therefore exert himself physically if there are several items of furniture, so that the furniture can easily be damaged or the end user can injure himself if he is unused to such activities. A further problem is that fitting parts are often missing from the package containing the furniture parts, as a result of which the end user is forced to obtain replacements from the vendor. Moreover, assembly by the end user causes undesirable dirtying, for example owing to glue residues, dust, chippings etc. After assembly is complete, the end user must therefore clean the assembly site and clear away the tools.

Furniture is also known from the prior art that can be assembled by angling (i.e. a pivoting movement) and/or snapping (i.e. latching) the furniture parts or boards to be connected to each other by means of corresponding profiles having mechanical locking elements. Such a connection is also referred to as a click connection. Furniture assembled in this manner offer a certain improvement. However, such solutions require a solid material of significant thickness as the board material, since sufficiently stable profiles can be produced only in this manner. The connection arrangements produced therefrom and consequently the furniture produced therefrom are therefore comparatively heavy and difficult to handle. The assembler, who as an end user generally lacks practice, must therefore handle a relatively high weight both during transport and during assembly, which often requires the assistance of an additional person.

DE 10 2007 007 832 A1 discloses a panel that consists of a sandwich structure having two covering layers, two honeycomb layers and an intermediate layer arranged between the honeycomb layers. This is also a lightweight board within the meaning of the present invention, the two honeycomb layers and the intermediate layer together forming the middle layer. The intermediate layer consists of a wood-based material and has a tongue profile on one side and a groove profile on the other side. The tongue profile consists of a projection in the form of an arrowhead (FIG. 1, item 14), the groove profile is formed in a manner complementary thereto (negative shape). Two panels can be connected to each other by joining a tongue profile to a corresponding groove profile of another panel of the same type. The profiles, i.e. the tongue profile and the groove profile, are formed in such a manner that mechanical locking, that is, a form fit, is provided in the longitudinal direction (direction of the board plane) and in the direction perpendicular to the longitudinal direction (direction perpendicular to the board plane). Such panels are however only suitable for producing flat panelling or flat surfacing.

BRIEF SUMMARY OF THE INVENTION

Proceeding from the above-described prior art, it is an object of the present invention to simplify the production of a connection arrangement, in particular the production of an item of furniture.

The object derived and disclosed above is achieved according to a first teaching of the present invention, in a lightweight board having an upper covering layer, which extends in a longitudinal direction (i.e. in the direction of the board plane), having a lower covering layer, which extends parallel to the upper covering layer and is spaced apart from the upper covering layer in a direction perpendicular to the longitudinal direction (i.e. in a direction perpendicular to the board plane), having a light middle layer, which extends between the upper covering layer and the lower covering layer, and having a bar, which extends between the upper covering layer and the lower covering layer and consists of wood or wood-based material or any other material, in that the bar has a tongue profile and/or groove profile that is worked, that is, produced by machine-cutting, or an extruded or pressed tongue profile and/or groove profile, which is formed for mechanical locking in the longitudinal direction and in the direction perpendicular to the longitudinal direction with a corresponding profile of a further component.

A corresponding profile means a profile that is shaped in a complementary manner to the other profile, at least in some sections, so that one profile (tongue profile) fits into the other profile (groove profile). In the assembled state, that is, when the profiles are inserted into each other, there is mechanical locking, that is, the shape of the profile provided in the bar is such that a form fit can be produced. This also applies to the shape of the profile of the other component. The respective profile or profiles can be formed in such a manner that only a form fit exists or that a force fit also exists in addition to the form fit.

The lightweight board according to the invention can also have further bars in addition to the bar mentioned above, of which one or all can likewise have a profile as defined above. The bar(s) preferably consist of wood or a wood-based material. Wood means solid wood. A wood-based material means a pressed body consisting of wood particles (wood chips, wood fibres and/or wood strands) provided with a binder. The bar can therefore be a strip-shaped section of a wood-based material board, in particular plywood, chipboard, fibreboard or OSB (oriented strand board). Alternatively, the bar can also consist of plastic, for example ABS (acrylonitrile-butadiene-styrene), PVC (polyvinyl chloride) and/or PU (polyurethane) and may also contain plastic recycling material. Or the bar consists of WPC (Wood Plastic Composite), that is, a composite of wood particles and plastic, or of a metal, for example aluminum. Combinations of the bar materials mentioned are also possible. If a wood-based material is used as the bar material, the wood particles used, such as chips, fibres or strands, can also have a predefined orientation, i.e. most of the wood particles per unit volume (per $cm^3$) are oriented in the same direction in order to achieve certain elasticity properties in accordance with the intended profile geometry. Reinforcements or other strengthening means, for example plastic and/or fabric and/or metal fibres or strips, can be provided, particularly if a wood-based material is used as the bar.

The respective bar having the profile can either have just a tongue profile or just a groove profile or both a groove and a tongue profile. The profile can be produced in the respective bar as mentioned by machine-working, in particular by milling or broaching. It is however also possible, in particular if a bar consists of plastic or WPC, to extrude the profile together with the bar. In other words, the bar is then produced at the same time as the profile. It is also conceivable to produce the profile by pressing, the profile being produced at the same time during pressing of the bar.

A lightweight board as described above has the advantage that it is particularly easy to handle owing to its low weight, which is advantageous in particular in the production of furniture for a generally unskilled end user. The assembly of a connection arrangement, in particular the assembly of an item of furniture, is considerably simplified by the provision for the first time of a tongue profile and/or groove profile that allows mechanical locking in one or more bars of a lightweight board, since fittings of any kind can be dispensed with. The end user only has to put the two corresponding profiles of the lightweight board and of the component to be connected together or insert them into each other, for example by angling them in (click connection) or by snapping (latch connection). A combination of a click connection and a latch connection is also conceivable when putting a corresponding pair of profiles together.

The use of tools can also be dispensed with in that the possibility of connecting a lightweight board to a further component in the manner described (click and/or latch connection) is created for the first time according to the invention. A connection arrangement, in particular an item of furniture, can be assembled quickly and without the use of tools and is nevertheless very light and easy to manipulate.

As already mentioned above, the light middle layer can consist of different materials. A honeycomb core, in particular a cardboard honeycomb structure, and/or a plastic, in particular an expanded plastic having gas pockets, and/or a light wood-based material or light wood, is preferably used as the light middle layer. Other materials provided with cavities are also conceivable. The term "light" means here that the density is lower than that of the covering layers.

The material of the covering layers can also be formed in different ways, as mentioned above. The upper and/or lower covering layers can preferably be formed by one or more wood-based material boards, for example chipboards, fibreboards or OSB boards. In the case of a fibreboard, it is preferably an MDF board. Alternatively to wood-based material boards, a laminate can also be used, that is, a layer consisting of a plurality of resin-impregnated papers compressed together. The covering layers can also be coated in a decorative manner. In this connection it is pointed out that, if a groove profile that continues through the adjacent covering layer is provided in the respective bar having a profile, said covering layer may consist of two parts that are not connected directly to each other, namely if the groove or groove profile continues over the entire transverse or longitudinal extent of the lightweight board; in such a case the covering layer can therefore consist of two or more covering boards, for example wood-based material boards.

The bar that has the respective profile can, as mentioned, be a single bar, which is therefore not connected to other bars, but only to at least one or preferably both covering layers. The bar can however be part of a frame consisting of a plurality of bars, the bar in this case too being connected to one of the covering layers, preferably to both covering layers. The connection of the bar having the profile to the covering layers preferably takes place by adhesive bonding.

The bar having the profile can be a transverse bar or a longitudinal bar. Transverse bar means that the bar extends transversely to the longitudinal direction of the lightweight board or the covering layers. Longitudinal bar means that the bar extends in the longitudinal direction. The bar can extend over the entire width of the lightweight board (transverse bar) or over the entire length of the lightweight board (longitudinal bar). The bar can be provided with the profile or profiles over its entire extent.

As mentioned, the lightweight board can also have a plurality of bars of the above-defined type, it being possible then for these to be formed in different ways.

Further configurations of the lightweight board according to the invention are described below.

According to a first configuration, the tongue profile can have a first, in particular hook-shaped projection that widens in sections. The projection therefore gets bigger for a time in the direction of its front (distal) end and/or its cross section widens. The projection can have the shape of an arrowhead or half an arrowhead if it is hook-shaped. In the case of an arrowhead, the projection has a hook (counter hook) in cross section both towards the upper side and towards the lower side, in the case of half an arrowhead only towards one side.

The tongue profile can also have a further projection, which extends adjacently to the first projection, in particular in relation to the direction perpendicular to the longitudinal direction, a gap being formed between the further projection and the first projection. The further projection can then likewise be formed such that it widens in sections, in particular in a hook-shaped manner, and preferably have a shape that is mirror-symmetrical to the shape of the first projection. In the latter case, the tongue profile in particular has the shape of an arrowhead having one upwardly pointing and one downwardly pointing hook (counter hook), a gap or slot extending from the distal end through the arrow in the direction of the shoulder of the tongue profile. Such a slotted tongue profile has the advantage that the two projections of the tongue profile can be moved towards each other, namely by the width of the slot, which makes snapping (latching) with a corresponding groove profile easier.

The first and/or further projection of the tongue profile can extend in an extension direction beyond a flat face that forms the narrow side or the upper side of the lightweight board. The flat face is the start of the tongue profile, that is, the rear end or the shoulder. From this point the tongue profile or the first and/or further projection extends in the said extension direction towards the distal end. If the flat face is the narrow side of the lightweight board, the extension direction runs parallel to the longitudinal direction and thus in the direction of the board plane. If the flat face is the upper side of the lightweight board, the extension direction runs perpendicular to the longitudinal direction and thus perpendicular to the board plane.

If the flat face from which the first and/or further projection extends in the extension direction is the narrow side of the lightweight board, it is preferred for the narrow-side edges of the upper covering layer and/or lower covering layer to run flush with the flat face. However, it is alternatively also conceivable for the narrow-side edges of the upper covering layer and/or lower covering layer to be part of the respective projection of the tongue profile. In the latter case, the upper and/or lower covering layer can therefore be part of the tongue profile.

According to a further configuration, it can be provided for the groove profile to have a groove bottom—this means the deepest point of the groove—and two mutually opposite groove walls, which extend from the groove bottom to a groove opening—this means the upper open end of the groove. At least one of the groove walls has, or preferably both groove walls have a section that projects towards the groove interior and forms a stop in the direction from the groove bottom to the groove opening. In this manner, mechanical locking in the joined state of two corresponding profiles can be ensured with simple means. In particular, the groove profile can widen in sections from the groove bottom to the groove opening and narrow again further on (from the groove bottom to the groove opening). The narrowed section then preferably forms a stop in the direction from the groove bottom to the groove opening, which effects the mechanical locking.

The groove opening can lie within the upper covering layer, as already mentioned above. In this case, the groove profile, which is provided in the bar, therefore continues through the adjacent covering layer. The groove opening is therefore formed by two mutually opposite edges of the upper covering layer. The groove opening can however also be arranged between the upper covering layer and the lower covering layer. It is also conceivable for the narrow-side edges of the upper covering layer and/or lower covering layer to be part of the groove profile. In this case, the upper and/or lower covering layer can therefore be part of the groove profile.

The course of the groove walls (from the groove bottom to the groove opening) can be mirror-symmetrical in relation to a plane running perpendicularly through the groove. In principle, however, it is also conceivable for the two groove walls to have a different course.

According to another configuration, it is provided for the tongue profile and/or groove profile to have a cross section that is uniform in the direction transverse to the longitudinal direction. In other words, the cross section of the profile does not change over the length (extension direction) of the bar in this case. According to the invention, some of the length, in particular most of the length, or else the entire length of the bar, can be provided with a profile. In other words, it can therefore be provided for the tongue profile and/or groove profile to extend over the entire length of the bar from a first end-face end to a second end-face end of the bar. In the case of a groove profile, the groove profile therefore ends at the respective end-face end of the bar, that is, the end-face end of the groove profile lies in the same plane as the end-face end of the bar. In order to be able to edge the end-face end of the bar in the case that the groove profile reaches as far as there, it is advantageous if the end-face end of the groove profile and thus the end-face end of the bar is covered. In particular, the first and/or second end-face end of the bar is covered by a further bar, which runs transversely to the bar and likewise extends between the upper covering layer and the lower covering layer. In this manner, the narrow sides of the lightweight board are virtually completely closed, where applicable with the exception of a narrow gap in the region of the upper covering layer edge. According to another configuration, the bar is in contact with the upper covering layer and/or lower covering layer. The bar is preferably in contact with both covering layers. The bar is particularly preferably connected permanently, for example by adhesive bonding, to the upper and/or lower covering layer. In this case a cut-out can be provided in the region in which the bar is inserted between the covering layers, said cut-out reaching into the material of the covering layers. In other words, the covering layer directly adjacent to the bar can have an inner recess, e.g. milled portion, which receives the bar. The covering layer is therefore thinner in this region than in the remaining portion. In particular, the distance between the upper covering layer and the lower covering layer is therefore larger in the region in which the bar is in contact with the respective covering layer than in another region. In particular, the distance between the upper covering layer and the lower covering layer is smaller in the region in which the middle layer runs than in the region in which the bar runs.

The object is also achieved according to a second teaching of the present invention by a connection arrangement, which can form part of an item of furniture or can form an item of furniture, comprising a lightweight board as defined above and comprising a further component, which has a profile that corresponds to the profile provided in the bar of the lightweight board, the further component being connected to the lightweight board by means of the profiles in such a manner that mechanical locking exists in the longitudinal direction and in the direction perpendicular to the longitudinal direction.

The further component is in particular a further lightweight board, preferably likewise a lightweight board as defined above. In this case, one lightweight board can have a tongue profile and the other lightweight board can have a groove profile corresponding thereto, the two lightweight boards forming the connection arrangement or a part thereof when joined together.

The further component can also be a wood-based material board, for example a plywood board, chipboard, fibreboard or OSB.

The further component can also be a connection strip, which preferably consists of wood or wood-based material or a plastic, in particular extruded plastic. The connection strip can be used as an intermediate piece for connecting the lightweight board according to the invention to at least one other component. The other component can be other boards, e.g. a wood-based material board, or another lightweight board, in particular another lightweight board of the same type. In other words, if the further component is a connection strip, the connection arrangement according to the invention can have still further components in addition to the further component, which are connected to the connection strip.

The connection between the lightweight board and the further component takes place according to the invention in a manner that produces mechanical locking, that is, a form fit. The lightweight board can be connected to the further component by snapping and/or angling in. In other words, the corresponding profiles of the lightweight board according to the invention and of the further component connected thereto are each shaped in such a manner that mechanical locking and in particular a connection by snapping and/or angling in is possible.

Finally, the object is also achieved by a method for producing a connection arrangement as described above, in which the following steps are carried out, preferably in the following order:

providing a lightweight board having an upper covering layer, which extends in a longitudinal direction, having a lower covering layer, which extends parallel to the upper covering layer and is spaced apart from the upper covering layer in a direction perpendicular to the longitudinal direction, having a light middle layer, which extends between the upper covering layer and the lower covering layer, and having a bar, which extends between the upper covering layer and the lower covering layer and consists of wood or wood-based material, machine-working a tongue profile and/or groove profile out of the bar using a cutting tool, and connecting the lightweight board to a further component that has a profile corresponding to the profile provided in the bar of the lightweight board, the further component being connected to the lightweight board by means of the profiles in such a manner that mechanical locking exists in the longitudinal direction and in the direction perpendicular to the longitudinal direction.

The above-mentioned cutting tool can be a milling head or the like.

As already mentioned, the profile can also be produced in a manner other than machine-working, for example by extrusion or pressing, preferably at the same time as the production of the bar. The latter can, as previously mentioned, also consist of materials other than a wood-based material or wood, for example of plastic, WPC or metal.

The step of producing, in particular machine-working, the profile can also take place before the step of providing the lightweight board. In other words, the profile can already be provided in the bar before the individual layers of the lightweight board are joined together, in particular adhesively bonded together, with the bar. In this case it is also conceivable to provide a lower covering layer first, to place the bar that is already provided with a profile and the middle layer thereon, and finally to place the upper layer thereon.

Alternatively, however, a lightweight board consisting of a lower covering layer, a middle layer lying thereon and an upper covering layer again lying thereon can be provided first, and the bar (which has already been provided with the profile where applicable) can be inserted into a corresponding recess in the lightweight board afterwards. In other words, it can be provided for a lightweight board (in particular a lightweight board without a bar) having an upper covering layer, which extends in a longitudinal direction, having a lower covering layer, which extends parallel to the upper covering layer and is spaced apart from the upper covering layer in a direction perpendicular to the longitudinal direction, having a light middle layer, which extends between the upper covering layer and the lower covering layer to be provided during the step of providing the lightweight board, then for a cut-out to be provided in the lightweight board (in particular in the edge region), which can take place by machine cutting, and then for the bar to be inserted, in particular adhesively bonded, into the cut-out, the step of machine-working the tongue profile and/or groove profile out of the bar taking place afterwards.

According to one configuration, it is provided for the cutting tool to shape or machine the upper covering layer and/or lower covering layer as well during the step of machine-working the tongue profile and/or groove profile out of the bar. In particular, the respective covering layer is part of the profile.

As already mentioned, the tongue profile and/or groove profile can be provided over the entire length of the bar from a first end-face end to a second end-face end of the bar; the respective profile therefore ends at the end-face end of the bar. If the profile provided in the bar is a groove profile, it can be provided for a cut-out that runs transversely to the bar to be provided in the lightweight board after the step of machine-working the groove profile out of the bar between the covering layers, and then for a further bar that runs transversely to the bar to be inserted into the cut-out in such a manner that the further bar covers one of the end-face ends of the bar having the groove profile. The groove profile formed in one or both end-face ends of the bar can thereby be covered with simple means, namely with a further bar. In this manner the narrow side or sides of the lightweight board can be edged and/or coated in a particularly simple manner, as explained further below.

In the lightweight board according to the invention and in the method according to the invention, the above-described bars, that is, the bars provided with a profile and the further bars that cover the bars provided with the profile at the end faces, can also be inserted in pairs. For instance, a first bar pair of two parallel bars can be inserted first, in particular into a cut-out between the covering layers that was produced beforehand for the respective bar. Then the desired profiles, that is, a tongue profile and/or a groove profile, can be milled into the two bars of the bar pair. Then a second bar pair likewise having bars parallel to each other can be inserted, the bars of the second bar pair running transversely to the bars of the first bar pair. The bars of the second bar pair can likewise be inserted into a cut-out between the covering layers that was produced correspondingly beforehand. In this manner, the two bars of the second bar pair cover the two end-face ends of the two other bars and thus also a groove profile running as far as the respective end-face end. Then the narrow sides can be provided with an edge strip (edged).

Before the lightweight board is connected to a further component, it can be provided according to another configuration for at least one narrow side, preferably all the narrow sides, of the lightweight board to be edged and/or provided with a coating after the step of machine-working a tongue profile and/or groove profile out of the bar. In particular, the respective narrow side can be provided with a cover in the form of a resin-impregnated paper, a laminate, a wood, wood-based material or plastic strip or a foil.

The lightweight board according to the invention can then be processed further, for example by introducing holes, for example holes for dowels or inserts, or by inserting or attaching fitting elements, for example hinge elements, drawer slides etc.

The invention is not limited to the use for furniture. Lightweight boards having the above-defined features can also be used as partitions, room dividers or in exhibition stand construction.

BRIEF DESCRIPTION OF THE DRAWINGS

A multiplicity of possibilities now exists to configure and develop the lightweight board according to the invention, the connection arrangement according to the invention and the method according to the invention. In this respect, reference is made to the claims, and to the description of exemplary embodiments in connection with the drawing. In the drawing:

DETAILED DESCRIPTION OF PREFERRED EMBODIMENTS

Figure 1A:
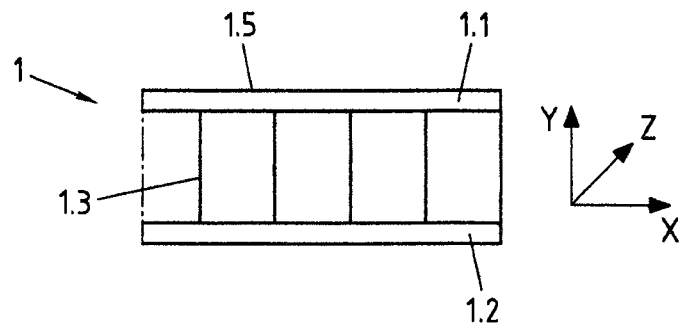
FIG. 1a) to e) schematically show the production of a tongue profile in a lightweight board, FIG. 2a) to c) schematically show the production of a groove profile in another lightweight board, FIG. 3a) to e) schematically show the production of a groove profile in yet another lightweight board, FIG. 4a) and b) show a first exemplary embodiment of a connection arrangement, FIG. 5a) shows a further exemplary embodiment of a connection arrangement, and FIG. 5b) shows yet another exemplary embodiment of a connection arrangement.

FIG. 1a) shows a lightweight board 1 having an upper covering layer 1.1, which extends in a longitudinal direction X, having a lower covering layer 1.2, which extends parallel to the upper covering layer 1.1 and is spaced from the upper covering layer 1.1 in a direction Y perpendicular to the longitudinal direction X, and having a light middle layer 1.3, which extends between the upper covering layer 1.1 and the lower covering layer 1.2.

In this lightweight board 1, a wood-based material board is provided in each case as the upper and lower covering layers 1.1 and 1.2, respectively, and a cardboard honeycomb structure is provided as the middle layer 1.3.

Figure 1B:
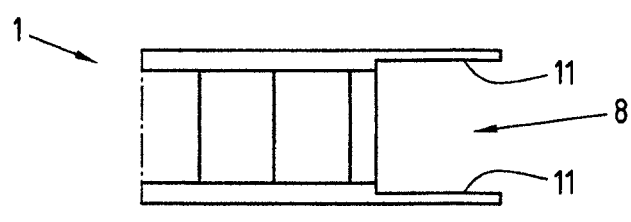
Figure 1C:
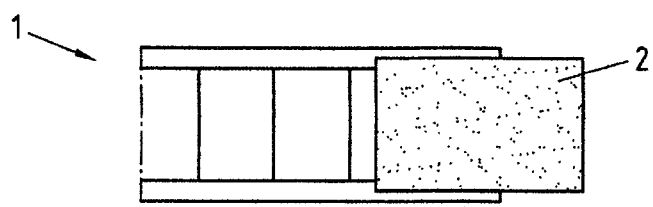

The lightweight board 1 provided in this manner can, as shown in FIG. 1b), be subjected to machine-cutting, a cut-out 8 for a bar 2 being provided between the covering layers 1.1 and 1.2. The cut-out 8 extends (in the direction Y) not only through the entire middle layer 1.3, but into the two covering layers 1.1 and 1.2. In other words, material is also removed from the covering layers 1.1 and 1.2, so that a recess 11 is produced in both the covering layers 1.1 and 1.2. FIG. 1c) shows how a bar 2 having a rectangular cross section consisting of a wood-based material is inserted into the cut-out 8. The bar 2 is permanently connected to the two covering layers 1.1 and 1.2 by adhesive bonding. The width of the bar 2 (dimension in direction X) is greater than the depth of the cut-out 8. The bar 2 then projects out of the cut-out 8 in the longitudinal direction X. In this manner, a tongue profile 3 can be provided in the bar 2 (FIG. 1d)) without having to remove a significant amount of covering layer material. Milling losses are avoided thereby. As the dashed lines show, only a very small part of the covering layers 1.1 and 1.2 is removed during production of the tongue profile 3. This is particularly advantageous if the covering layers 1.1 and 1.2 have already been provided with decoration.

Figure 1D:
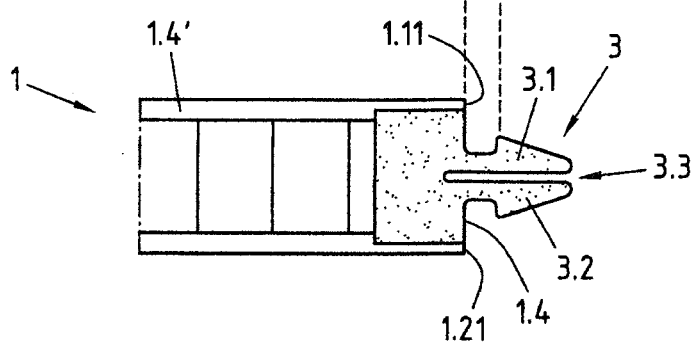

The tongue profile 3 of FIG. 1d) has two projections 3.1 and 3.2 in a hook shape, formed in a mirror-symmetrical manner. A gap 3.3 is provided between the projections. Each projection 3.1 and 3.2 has the shape of half an arrowhead. In other words, the tongue profile has the shape of a (complete) arrowhead with a slot that extends from the distal end in the direction of the profile shoulder. The slot or gap 3.3 extends in this case from the front end of the tongue profile 3 or of the projections 3.1 and 3.2 to behind the narrow side 1.4 of the lightweight board 1.

The first projection 3.1 and the further projection 3.2 of the tongue profile 3 extend beyond the narrow side 1.4 of the lightweight board 1, which is formed here by a flat face, in the longitudinal direction X. The narrow-side edges 1.11 and 1.21 of the upper and lower covering layers 1.1 and 1.2 run flush with the flat face. In other words, the narrow-side edges 1.11 and 1.21 together with the flat face form the narrow side of the lightweight board 1.

Figure 1E:
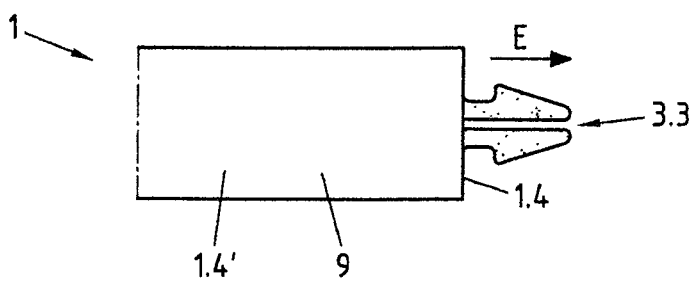

Finally, FIG. 1e) shows that after production of the tongue profile 3 some or all of the narrow sides 1.4 and/or 1.4' of the lightweight board 1 can be edged and/or a coating 9 can be applied to the respective narrow side 1.4 and/or 1.4'. The gap 3.3 that gives the tongue profile 3 the necessary deformability can be clearly seen. The gap 3.3 extends as mentioned from the front (distal) end of the tongue profile 3 over its entire length to beyond the shoulder region, in this case defined by the narrow side 1.4, into the region of the bar 2 that is covered by the covering layers 1.1 and 1.2.

After the tongue profile 3 has been milled, further grooves can advantageously be milled into the lightweight board 1, for example for receiving a rear wall.

Figure 2A:
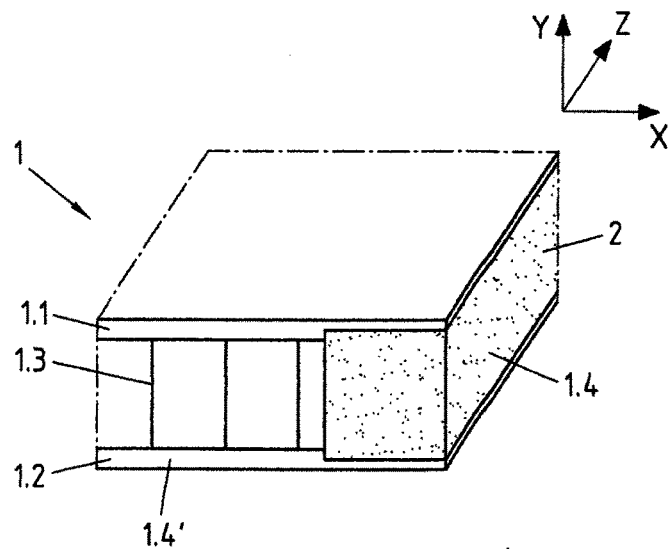

FIG. 2*a*) to *c*) show another lightweight board 1 having a groove profile 4 corresponding to the tongue profile 3 defined using FIG. 1*a*) to *e*). The individual production steps of the profile 4 are also shown schematically here.

First, a lightweight board 1 likewise having an upper covering layer 1.1, a lower covering layer 1.2 and a middle layer 1.3 is provided, the lightweight board 1 already having a bar 2 consisting of a wood-based material. The bar is adhesively bonded permanently to the two covering layers 1.1 and 1.2.

In this lightweight board 1 too, a wood-based material board is provided in each case as the upper and lower covering layers 1.1 and 1.2 and a cardboard honeycomb structure is provided as the middle layer 1.3.

Figure 2B:
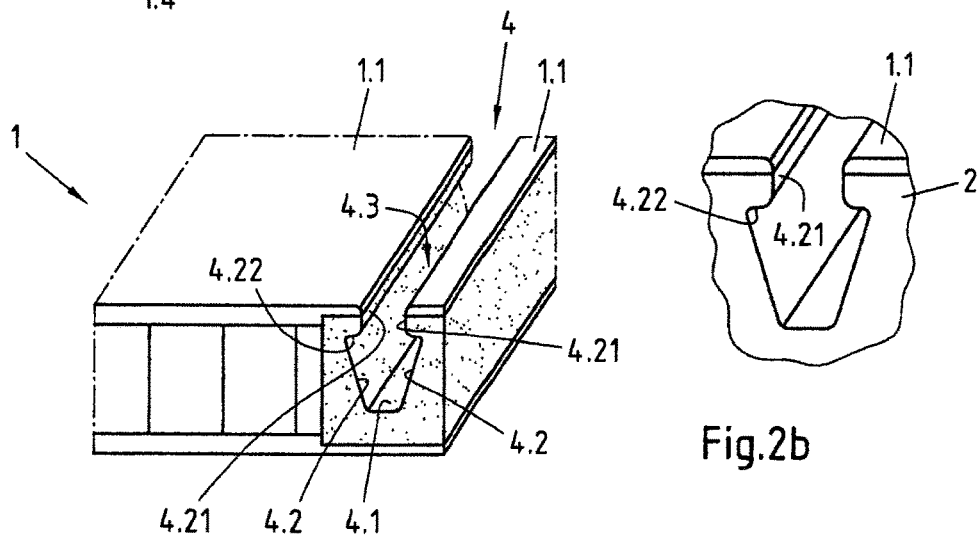
Figure 2C:
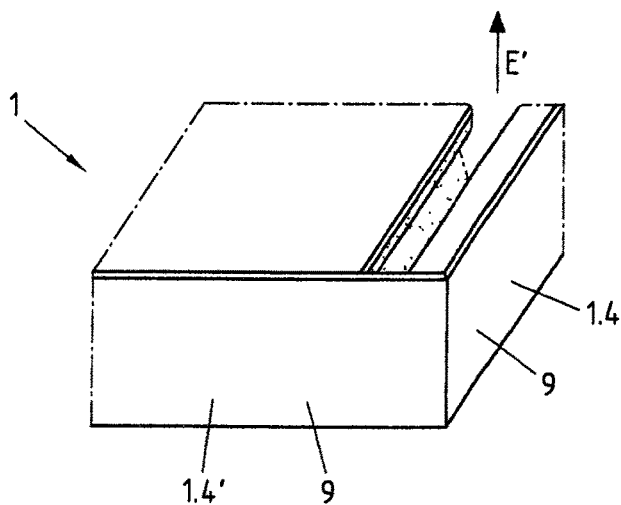

FIG. 2*b*) shows, also in an enlarged detail view, the lightweight board 1 after the groove profile 4 has been made, for example by milling. The groove profile 4 preferably extends over the entire extent of the parallel side edge 1.4 of the lightweight board 1, it being possible, as shown in FIG. 2*c*), for any holes produced in the narrow sides 1.4' to be covered according to the invention by subsequent edging (application of a covering 10 and where applicable of a coating 9, for example a melamine edge consisting of a laminate or a plastic edge).

The groove profile 4 shown in FIG. 2*b*) has a groove bottom 4.1 and two mutually opposite groove walls 4.2, which extend from the groove bottom 4.1 to an opposite groove opening 4.3. Since the groove profile 4 extends through the upper covering layer 1.1 and also runs over the entire width of the lightweight board 1, the upper covering layer 1.1 is in this case divided into two; it therefore consists of two part-boards after the groove profile 4 has been made/milled.

Both groove walls 4.2 widen uniformly from the groove bottom 4.1 in the direction of the groove opening 4.3 as far as a section 4.21 that projects towards the groove interior and forms a stop 4.22 in the direction from the groove bottom 4.1 to the groove opening 4.3 for mechanical locking. The course of the groove walls 4.2 is mirror-symmetrical to an imaginary plane running in a perpendicular direction Y, the profile 4 having a cross section that is uniform in the direction Z transverse to the longitudinal direction X.

Figure 3A:
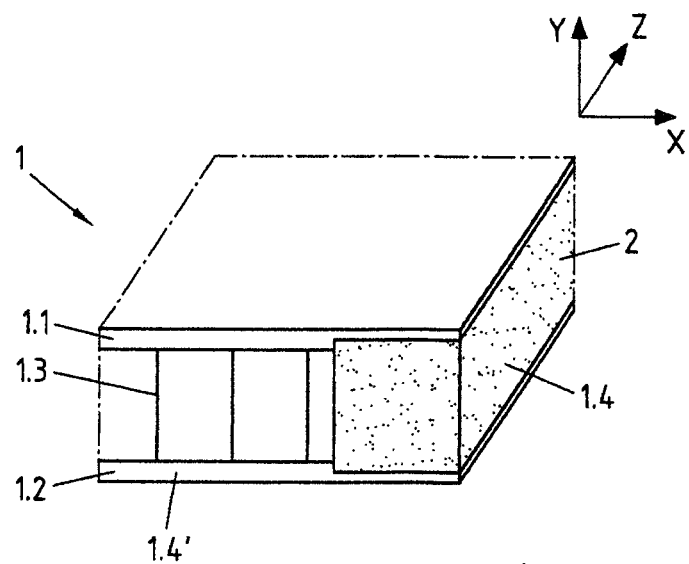

In FIG. 3*a*) to *e*) it is shown using a further exemplary embodiment how a groove profile 4 can be provided in a lightweight board 1. The view in FIG. 3*a*) corresponds to the view in FIG. 2*a*). Here too, a lightweight board 1 likewise having an upper covering layer 1.1, a lower covering layer 1.2 and a middle layer 1.3 is first provided, the lightweight board 1 already having a bar consisting of a wood-based material.

Figure 3B:
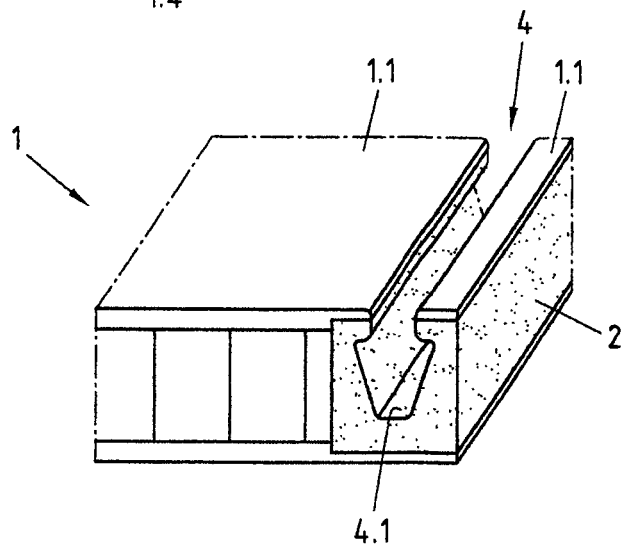

FIG. 3*b*) shows a view comparable to FIG. 2*b*), in this case a groove profile 4 also being provided in the bar 2, said groove profile extending through the upper covering layer 1.1 and also running over the entire width of the lightweight board 1. In this exemplary embodiment the groove profile has the same shape (in cross section) as the exemplary embodiment in FIG. 2*b*).

Figure 3C:
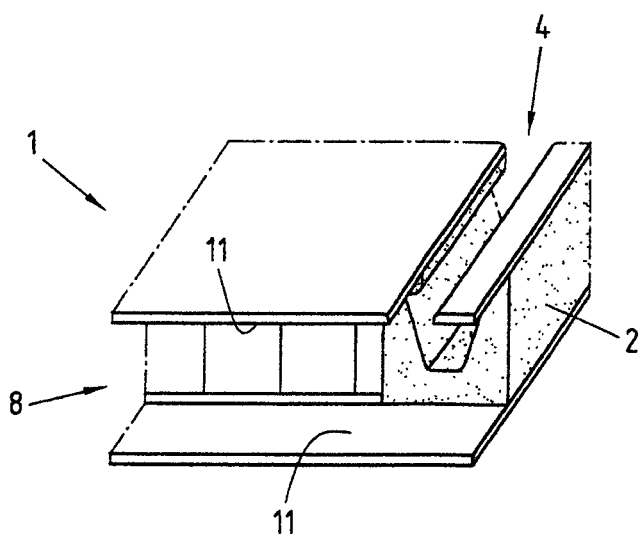

In contrast to the exemplary embodiment in FIG. 2*a*) to *c*), the narrow sides 1.4 and 1.4' in this case are not directly edged, but a further cut-out 8 is first provided between the covering layers, as shown in FIG. 3*c*), said cut-out extending transversely to the already inserted bar 2 having the groove profile 4. In other words, the cut-out 8 runs on a narrow side 1.4' of the lightweight board 1, which extends transversely (orthogonally) to the narrow side 1.4 of the lightweight board 1 at which the bar 2 having the groove profile 4 is inserted. The said cut-out 8 has a recess 11 in each of the covering layers 1.1 and 1.2, as has already been described using FIG. 1*b*).

Figure 3D:
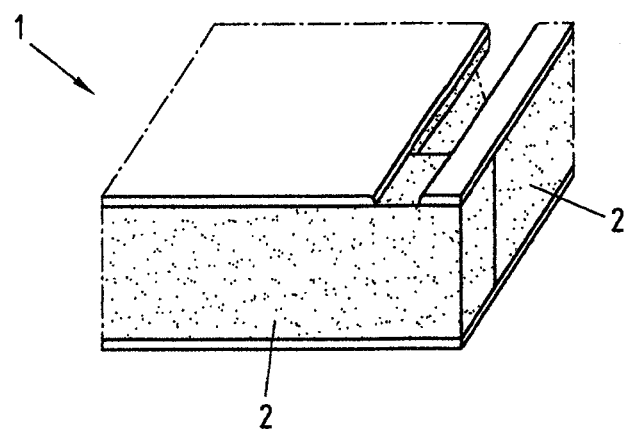
Figure 3E:
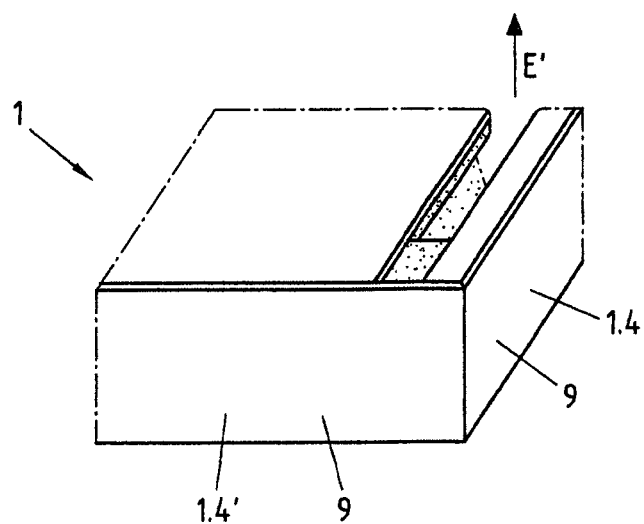

A further bar 2, which runs transversely to the bar 2 having the groove profile 4 that was inserted first, is then inserted into the cut-out 8, as shown in FIG. 3*d*). The further bar 2, which has no profile, covers the hole that is provided at the end-face end of the bar 2 having the groove profile 4 and is formed by the groove. In other words, the further bar 2 forms a covering of the end-face end of the bar 2 having the groove profile 4 in the direction of the narrow side 1.4' of the lightweight board 1. As shown in FIG. 3*d*), the edge region of the lightweight boards, that is, the narrow sides 1.4 and 1.4', respectively, are virtually completely closed thereby. Only a small gap in the region of the upper covering layer, which arises from the original groove 4, is still open to the side. However, this small gap can also be easily covered towards the narrow side 1.4' by the closing edges of the lightweight board 1 (FIG. 3*e*).

Figure 4A:
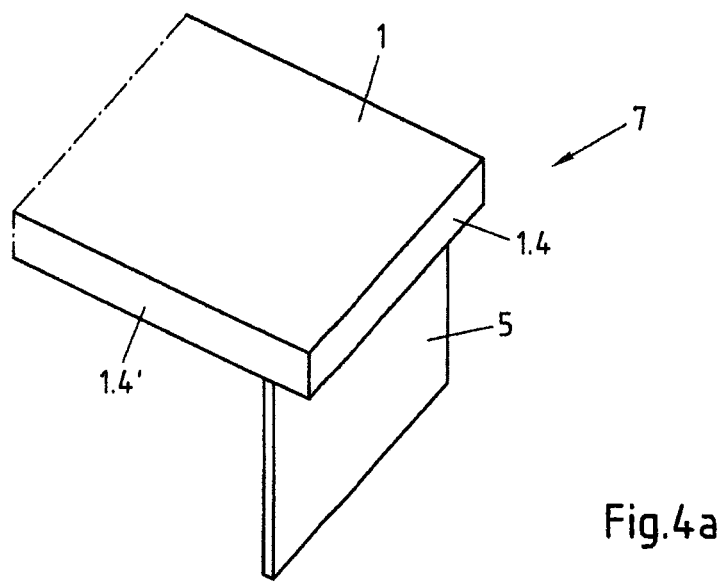
Figure 4B:
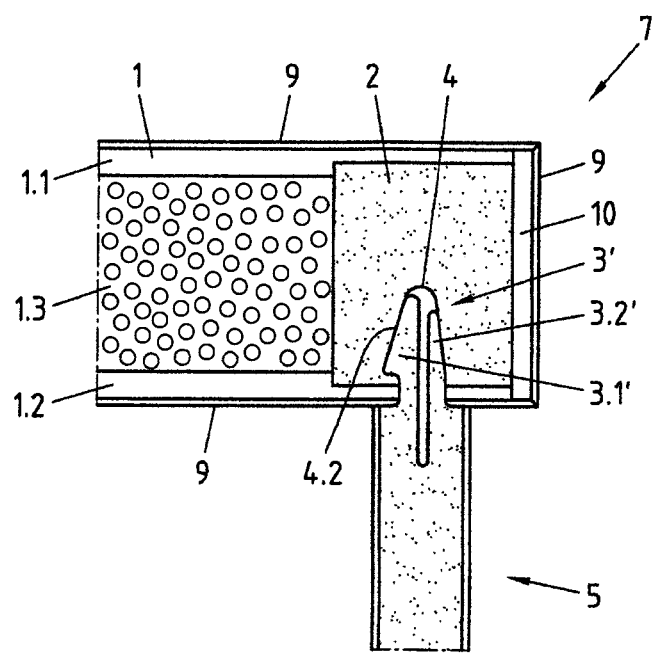

FIG. 4*a*) shows a perspective view of a connection arrangement 7, which is in this case part of a table. FIG. 4*b*) shows a corresponding sectional view.

In the connection arrangement 7 shown in FIG. 4*a*) and *b*), the lightweight board 1 has covering layers 1.1 and 1.2 consisting of a wood-based material, the middle layer 1.3 consisting in this case, in contrast to the exemplary embodiments described above, of an expanded plastic, for example of an expanded polystyrene.

In this case too, the lightweight board 1 is edged on the narrow sides 1.4 and 1.4', respectively, namely with a covering 10 in the form of a plastic strip. Furthermore, the lightweight board 1 is also provided with a coating 9 in the form of a decorative foil.

As shown in FIG. 4*b*), the groove profile 4 in the bar 2 is not symmetrical in this case, but has only one groove wall 4.2 having a stop for a corresponding profile 3' of a further component 5.

The further component 5 is a comparatively thin wood-based material board, for example a chipboard or fibreboard, which is likewise coated. In correspondence with the shape of the groove profile 4, the tongue profile 3' of the further component 5 is also not symmetrical, but has only one single hook-shaped projection 3.1'. The further projection 3.2' spaced apart therefrom does not have a hook. Such a connection arrangement 7 can be produced by a combination of angling in and snapping.

Figure 5A:
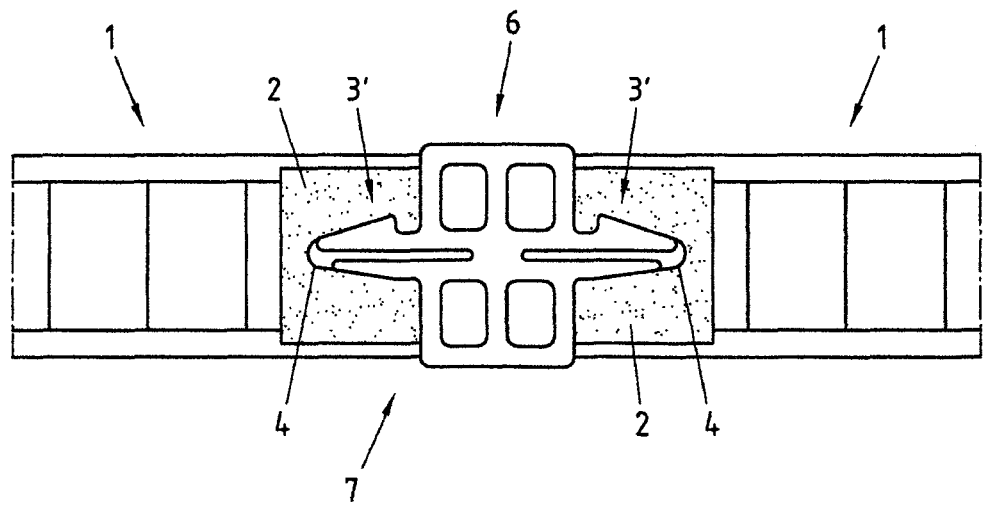
Figure 5B:
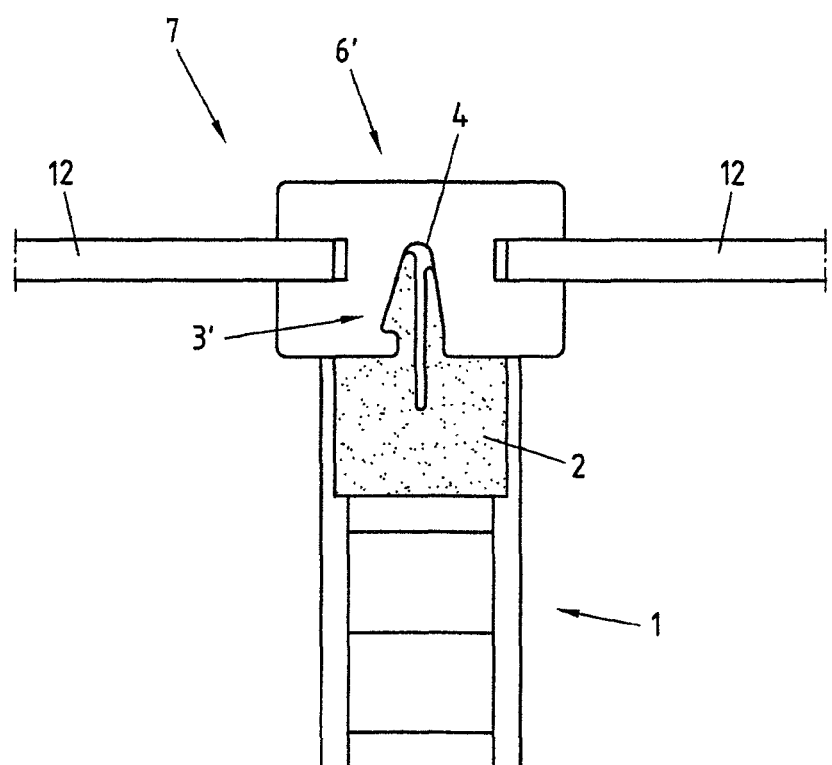

Finally, FIGS. 5*a*) and *b*) show a connection arrangement 7, with which a lightweight board 1 having a bar 2 with a groove profile 4 is likewise connected to a further component 6 or 6', in this case the further component being a connection strip. In the case of 5*a*), the connection strip 6 is an extruded profile consisting of WPC (Wood Plastic Compound), in the case of FIG. 5*b*) it is a connection strip 6' consisting of wood.

As shown in FIG. 5*a*) and *b*), the further component can also be an element other than a further board with the connection arrangement 7 according to the invention. This further element, in this case a connection strip 6 or 6', can then be used to connect yet more components to the lightweight board 1. In the case of FIG. 5*a*), for example, two lightweight boards 1 of the same type are connected to each other by means of the connection strip 6, likewise by a combination of angling in and snapping. In the case of 5*b*), the lightweight board 1, which here forms the centre point of an item of furniture, is connected to two rear walls 12 that are relatively thin in comparison with the lightweight board 1. This also takes place by a combination of angling in and snapping.

The invention claimed is:

1. A board comprising:
   an upper covering layer, which extends in a longitudinal direction;
   a lower covering layer, which extends parallel to the upper covering layer and is spaced apart from the upper covering layer in a direction perpendicular to the longitudinal direction;
   a middle layer including a material of a lower density than both of said covering layers, which extends between the upper covering layer and the lower covering layer; and
   a separate bar, which extends between the upper covering layer and the lower covering layer and consists of wood or wood-based material;
   wherein the bar is connected to and is in direct contact with both of said covering layers, and
   wherein the bar has at least one of a machine-worked tongue profile or a groove profile, which is formed for mechanical locking in the longitudinal direction and in the direction perpendicular to the longitudinal direction with a corresponding profile of a further component.

2. The board according to claim 1, wherein the tongue profile has a first projection that widens in sections.

3. The board according to claim 2, wherein the tongue profile has a further projection, which extends adjacently to the first projection, wherein a gap is formed between the further projection and the first projection.

4. The board according to claim 3, wherein at least one of the first projection or the further projection extends in an extension direction beyond a flat face that forms a narrow side or an upper side of the board.

5. The board according to claim 4, wherein narrow-side edges of at least one of the upper covering layer or the lower covering layer run flush with the flat face or are part of the projection.

6. The board according to claim 1, wherein the groove profile has a groove bottom and two mutually opposite groove walls, which extend from the groove bottom to a groove opening, wherein at least one of the groove walls has a section that projects towards the groove interior and forms a stop in the direction from the groove bottom to the groove opening.

7. The board according to claim 6, wherein the groove opening lies within the upper covering layer or between the upper covering layer and the lower covering layer.

8. The board according to claim 6, wherein a course of the groove walls is mirror-symmetrical.

9. The board according to claim 1, wherein the tongue profile or the groove profile has a uniform cross section in the direction transverse to the longitudinal direction.

10. The board according to claim 1, wherein the tongue profile or the groove profile extends over an entire length of the bar from a first end-face end to a second end-face end of the bar.

11. The board according to claim 10, wherein at least one of the first end-face end or the second end-face end of the bar is covered by a further bar, which runs transversely to the bar and likewise extends between the upper covering layer and the lower covering layer.

12. The board according to claim 1, wherein the bar is in contact with the upper covering layer and/or lower covering layer.

* * * * *